US010368692B2

(12) United States Patent
Grimaldi et al.

(10) Patent No.: US 10,368,692 B2
(45) Date of Patent: Aug. 6, 2019

(54) DYNAMIC CAPACITIVE RF FOOD HEATING TUNNEL

(71) Applicant: ILLINOIS TOOL WORKS, INC., Glenview, IL (US)

(72) Inventors: Giorgio Grimaldi, Northbrook, IL (US); Joshua M. Linton, Chicago, IL (US)

(73) Assignee: HUSQVARNA AB, Huskvarna (SE)

( * ) Notice: Subject to any disclaimer, the term of this patent is extended or adjusted under 35 U.S.C. 154(b) by 44 days.

(21) Appl. No.: 14/842,219

(22) Filed: Sep. 1, 2015

(65) Prior Publication Data

US 2017/0055766 A1 Mar. 2, 2017

(51) Int. Cl.
*A47J 37/01* (2006.01)
*A23L 5/10* (2016.01)
*H05B 6/60* (2006.01)

(52) U.S. Cl.
CPC .............. *A47J 37/015* (2013.01); *A23L 5/15* (2016.08); *H05B 6/60* (2013.01); *A23V 2002/00* (2013.01)

(58) Field of Classification Search
CPC ........ A47J 37/015; A23L 1/0128; H05B 6/60; A23V 2002/00
USPC ..... 99/324, 358, 451, 443 C, 339, 484, 477, 99/476; 219/703, 709, 700, 680, 707, 219/771, 780, 653–657, 775, 776; 426/244, 524
See application file for complete search history.

(56) References Cited

U.S. PATENT DOCUMENTS

| 3,470,942 | A | 10/1969 | Fukada et al. |
| 3,536,129 | A | 10/1970 | White |
| 3,809,845 | A | 5/1974 | Stenstrom |
| 3,974,355 | A | 8/1976 | Bach |
| 4,128,751 | A | 12/1978 | Sale |
| 4,196,332 | A | 4/1980 | MacKay et al. |
| 4,210,795 | A | 7/1980 | Lentz |
| 4,296,299 | A | 10/1981 | Stottmann et al. |
| 4,303,820 | A | 12/1981 | Stottmann et al. |

(Continued)

FOREIGN PATENT DOCUMENTS

| DE | 2910961 A1 | 10/1980 |
| DE | 102008052228 A1 | 4/2010 |

(Continued)

OTHER PUBLICATIONS

International Search Report and Written Opinion of the International Searching Authority for corresponding International Application No. PCT/2016/049651 dated Nov. 14, 2016.

*Primary Examiner* — Dana Ross
*Assistant Examiner* — Joseph M Baillargeon
(74) *Attorney, Agent, or Firm* — Burr Forman McNair

(57) ABSTRACT

A food preparation device may include a tunnel cavity having a prep portion and a cooking portion, a conveyor belt extending through a length of the tunnel cavity, a cooking controller operably coupled to the prep portion and the cooking portion to selectively distribute power to at least a radio frequency (RF) capacitive heating source and a cold air source in the prep portion and at least a heat source in the cooking portion, and an interface panel. The prep portion and the cooking portion are positioned in a linear series in the tunnel cavity. The RF capacitive heating source comprises a ground plate and an anode plate.

15 Claims, 15 Drawing Sheets

(56) References Cited

U.S. PATENT DOCUMENTS

| | | | |
|---|---|---|---|
| 4,316,070 A | 2/1982 | Prosise et al. | |
| 4,343,979 A | 8/1982 | Barbini et al. | |
| 5,961,871 A | 10/1999 | Bible et al. | |
| 6,247,395 B1* | 6/2001 | Yamamoto | A23B 4/07 |
| | | | 219/707 |
| 2007/0137633 A1* | 6/2007 | McFadden | A21B 1/245 |
| | | | 126/21 A |
| 2009/0236335 A1 | 9/2009 | Ben-Shmuel et al. | |
| 2009/0321428 A1 | 12/2009 | Hyde et al. | |
| 2010/0006564 A1 | 1/2010 | Ben-Shmuel et al. | |
| 2012/0097669 A1 | 4/2012 | Sim et al. | |
| 2012/0164022 A1 | 6/2012 | Muginstein et al. | |
| 2013/0200066 A1 | 8/2013 | Gelbart et al. | |
| 2013/0206749 A1 | 8/2013 | Libman et al. | |
| 2013/0228568 A1 | 9/2013 | Huynh et al. | |
| 2016/0100462 A1* | 4/2016 | Morassut | F24C 15/2007 |
| | | | 426/231 |

FOREIGN PATENT DOCUMENTS

| | | |
|---|---|---|
| EP | 0278592 A2 | 8/1988 |
| EP | 1052502 A2 | 11/2000 |
| EP | 1075799 A1 | 2/2001 |
| EP | 2051564 A1 | 4/2009 |
| EP | 2182774 A1 | 5/2010 |
| EP | 2205043 A1 | 7/2010 |
| EP | 2306785 A1 | 4/2011 |
| EP | 2434837 A1 | 3/2012 |
| EP | 2453716 A1 | 5/2012 |
| EP | 2475221 A1 | 7/2012 |
| FR | 2254286 A1 | 7/1975 |
| FR | 2353236 A1 | 12/1977 |
| FR | 2405023 A1 | 5/1979 |
| GB | 924071 A | 4/1963 |
| JP | S5436660 A | 3/1979 |
| JP | H03142350 A | 6/1991 |
| JP | H0541971 A | 2/1993 |
| JP | 2000357583 A | 12/2000 |
| JP | 2002359064 A | 12/2002 |
| JP | 2003332037 A | 11/2003 |
| JP | 2004349116 A | 12/2004 |
| JP | 2005000053 A | 1/2005 |
| JP | 2008034244 A | 2/2008 |
| JP | 2008269793 A | 11/2008 |
| JP | 2009032638 A | 2/2009 |
| JP | 2009259511 A | 11/2009 |
| JP | 2010092795 A | 4/2010 |
| JP | 2010127524 A | 6/2010 |
| JP | 2010140696 A | 6/2010 |
| JP | 2010177006 A | 8/2010 |
| WO | 198200403 A1 | 2/1982 |
| WO | 199308705 A1 | 5/1993 |
| WO | 200051450 A1 | 9/2000 |
| WO | 2003019985 A1 | 3/2003 |
| WO | 2007096878 A2 | 8/2007 |
| WO | 2010052723 A1 | 5/2010 |
| WO | 2010134307 A1 | 11/2010 |
| WO | 2011138688 A2 | 11/2011 |
| WO | 2011145994 A1 | 11/2011 |
| WO | 2012001523 A2 | 1/2012 |
| WO | 2012051198 A1 | 4/2012 |
| WO | 2012144129 A1 | 10/2012 |
| WO | 2013021280 A2 | 2/2013 |
| WO | 2013033330 A2 | 3/2013 |
| WO | 2013140266 A2 | 9/2013 |
| WO | 2014006510 A2 | 1/2014 |
| WO | 2014041430 A2 | 3/2014 |
| WO | 2014188422 A2 | 11/2014 |
| WO | 2014191799 A1 | 12/2014 |
| WO | 2015037004 A1 | 3/2015 |
| WO | 2015052145 A1 | 4/2015 |

* cited by examiner

DYNAMIC CAPACITIVE RF FOOD HEATING TUNNEL

TECHNICAL FIELD

Example embodiments generally relate to ovens and, more particularly, relate to dynamic capacitive radio frequency (RF) food heating tunnels.

BACKGROUND

Conventional conveyor ovens are widely used, among other things, for baking, cooking, and heating of food items such as pizza. The standard oven has an inlet opening and an outlet opening and a conveyor on which the food items designated for baking are placed. However, conventional conveyor ovens are not designed to thaw frozen foods.

Common thawing applications rely on the thermal conduction of heat from the surface to the interior to provide thawing. Due to freshness and product quality constraints, thawing often is done by immersion in water baths that are only slightly above freezing themselves or in refrigerators set to slightly above freezing (e.g., 35° F.-40° F.). Thawing times are often very long. With capacitive heating technologies that heat over the entire volume uniformly, thawing can be performed much more rapidly.

RF capacitive heating is typically used to thaw foods in an ambient environment. However, use of a capacitive RF system in an ambient environment causes the rate at which the surface of a food product thaws to be substantially faster than the rate of thawing at the core of the food product as a result of exposure to the environmental temperature at the surface level but not the core. Accordingly, it may be desirable to achieve an improved conveyor food preparation device capable of thawing a food product evenly from surface to core.

BRIEF SUMMARY OF SOME EXAMPLES

Some example embodiments may provide a multi-functional RF capacitive food preparation device. In particular, some example embodiments may provide a food preparation device that provides, for example, uniform, sanitary, and rapid thawing of a food product from the exterior surface to the interior core by thawing the interior core with an RF capacitive heating source while cooling the exterior surface with a cold air source. In addition, capacitive RF thawing better preserves the quality of previously frozen food and improves the overall yield of thawed food by mitigating water loss caused by cellular damage during prolonged conventional thawing processes. Moreover, the food preparation device may simplify food preparation by providing various operator-selectable recipes and cycles to further prepare the food product.

In an example embodiment, a food preparation device is provided. A food preparation device may include a tunnel cavity having a prep portion and a cooking portion, a conveyor belt extending through a length of the tunnel cavity, a cooking controller operably coupled to the prep portion and the cooking portion to selectively distribute power to at least a radio frequency (RF) capacitive heating source and a cold air source in the prep portion and at least a heat source in the cooking portion, and an interface panel. The prep portion and the cooking portion are positioned in a linear series in the tunnel cavity. The RF capacitive heating source comprises a ground plate and an anode plate.

In another alternative embodiment, a method of preparing food is provided. The method may include receiving a food product having an external surface and an interior core on a conveyor belt, conveying the food product through a tunnel cavity having at least two energy sources arrayed in a linear series, and controlling volumetric thermal conditions of the food product via the at least two energy sources.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
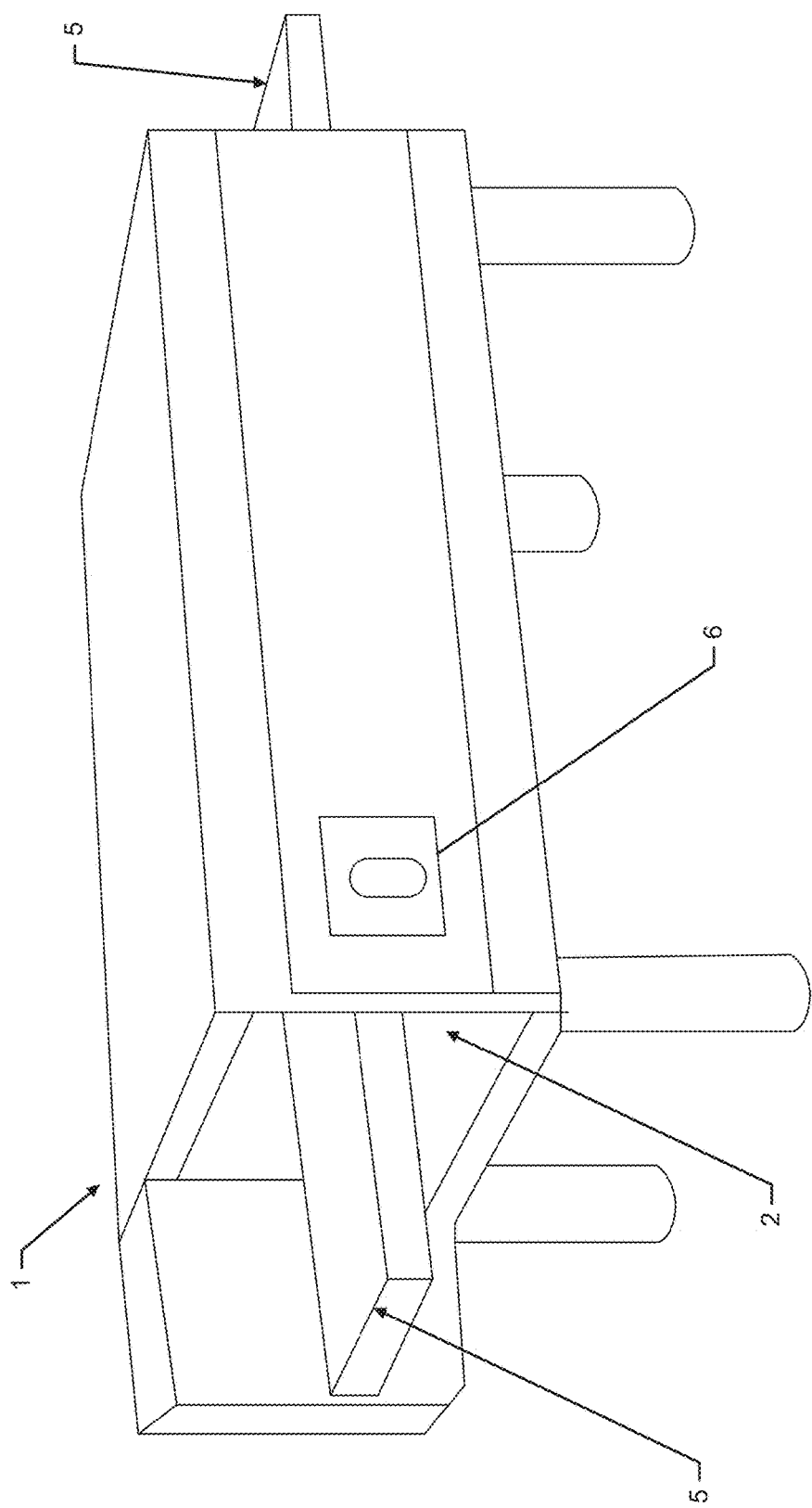
FIG. 1 illustrates a perspective view of a food preparation device employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the thawing and/or cooking performance of a food preparation device and/or may improve the operator experience of individuals employing an example embodiment. In this regard, some example embodiments may provide for the employment of multiple energy sources arrayed in a linear series to deliver energy to a food product conveyed through various portions of a tunnel cavity.

FIG. 1 illustrates a perspective view of a food preparation device 1 according to an example embodiment. The food preparation device 1 may be a heating device of any type for heating food products, thawing frozen materials, and/or the like. Thus, the food preparation device 1 need not necessarily be embodied only as a conveyor oven or blast chiller, but could alternatively be a thawing, warming, sterilizing or other device that applies RF energy. As shown in FIG. 1, the food preparation device 1 may include a conveyor belt 5 onto which a food product (e.g., pizza) may be placed for the application of energy (e.g., RF capacitive heat, cold air, heat and/or the like) that extends through the length of a tunnel cavity 2. In some cases, the food preparation device 1 may apply energy using any of at least two energy sources that may be employed by the food preparation device 1.

The food preparation device 1 may include an interface panel 6, which may sit proximate to one end of the tunnel cavity 2. The interface panel 6 may be the mechanism by which instructions are provided to the operator, and the mechanism by which feedback is provided to the operator regarding cooking process status, options and/or the like. In this regard, the interface panel 6 may be a guided user interface (GUI) that is easily programmed by the user according to unique usage demands of a particular foodservice establishment. In an example embodiment, the interface panel 6 may include a touch screen display capable of providing visual indications to an operator and further capable of receiving touch inputs from the operator. In certain example embodiments, the interface panel 6 may display preprogrammed recipes and cycles from which the operator may select a food preparation program. In other examples, the interface panel 6 may include a simple interface of buttons, lights, dials and/or the like. In further examples, an operator may remotely control the interface panel 6 from a mobile electronic device including, but not limited to, a smartphone, a tablet, a laptop and/or the like.

Figure 2:
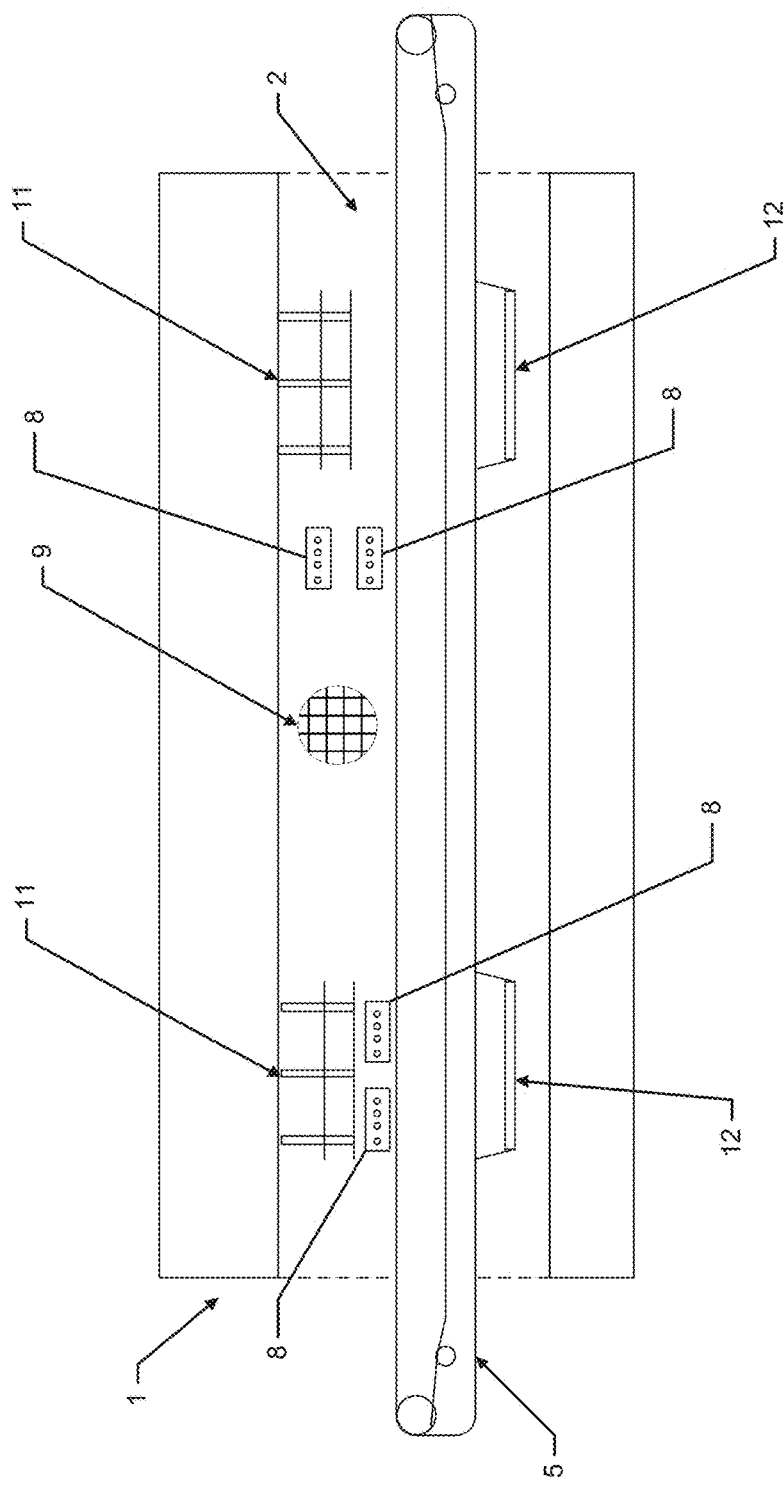
FIG. 2 illustrates a cross-sectional view of the food preparation device of FIG. 1 according to an example embodiment.

FIG. 2 illustrates a cross-sectional view of the food preparation device of FIG. 1 according to an example embodiment. As shown in FIG. 2, the food preparation device 1 may include at least two energy sources positioned in a linear series inside the tunnel cavity 2. In this regard, the conveyor belt 5 may convey a food product to a prep portion 50 of the tunnel cavity 2. The prep portion 50 may include a first energy source 10 (i.e. an RF capacitive heating source having an anode plate 11 and a ground plate 12). In addition, the prep portion 50 may include a second energy source 20 (i.e. cold air source). It should be appreciated, for example, that the prep portion 50 may include both the RF capacitive heating source and the cold air source for thawing operations. The prep portion 50 may be employed to prepare a food product for cooking by, for example, thawing, tempering, blast chilling, shock freezing and/or the like. After the food product is adequately prepared for cooking in the prep portion 50, the food product may be conveyed via the conveyor belt 5 to a cooking portion 60 of the tunnel cavity 2. The cooking portion 60 may include another iteration of the first energy source 10 ((i.e. a second RF capacitive heating source having an anode plate 11 and a ground plate 12). In addition, the cooking portion 60 may include a third energy source 30 (i.e. heat source). The cooking portion 60 may be employed to, for example, cook the interior core of a food product via the first energy source 10 and brown the exterior surface of the food product via the third energy source 30. It should be appreciated that although the cooking portion 60 should include a heat source to cook the food product, the second RF capacitive heating source may be optional. The first, second, and third energy sources 10, 20, and 30 may each correspond to respective different cooking methods or may be combined in one of several different cooking methods. However, it should be appreciated that additional energy sources may also be provided in some embodiments and, as stated above, some embodiments may only employ a single energy source.

In an example embodiment, the prep portion and/or the cooking portion 60 may include a shielded area in which a shield may be dropped over the food product either manually or automatically. In addition, the conveyor belt 5 may operate continuously or pause for a predetermined amount of time in each of the prep portion and the cooking portion. In this regard, the conveyor belt 5 may pause in, for example, the prep portion 50, and a shield may drop over a food product during thawing via the RF capacitive heating source and the cold air source. After thawing, for instance, the shield may be removed either manually or automatically, and the conveyor belt 5 may convey the food product to the cooking portion 60. Moreover, it should be appreciated that the conveyor belt 5 may be capable of conveying a food product in either a forward or reverse direction.

The at least two energy sources employed by the food preparation device 1 in the prep portion 50 of the tunnel cavity 2 include at least a cold air source and an RF capacitive heating source. The cold air source may include, for example, one or more jet plates 8 positioned within the tunnel cavity 2 so as to enable cold air to be forced over a surface of a food product placed within the tunnel cavity 2 via air delivery orifices disposed in the jet plates 8. If the jet plates 8 are employed, a chamber outlet port 9 may also be employed to extract air from the tunnel cavity 2. After removal from the tunnel cavity 2 via the chamber outlet port 9, air may be cleaned, chilled, and pushed through the system by other components prior to return of the clean, cold, and speed-controlled air back into the tunnel cavity 2. The chamber outlet port 9 and the jet plates 8 may also be arranged differently within the tunnel cavity 2 in alternative embodiments. By way of example only, if the prep portion 50 of the tunnel cavity 2 is employed to thaw a food product, the cold air source and the RF capacitive heating source may supply cold air energy and RF energy respectively to the food product simultaneously, as will be described in more detail herein.

Figure 14:
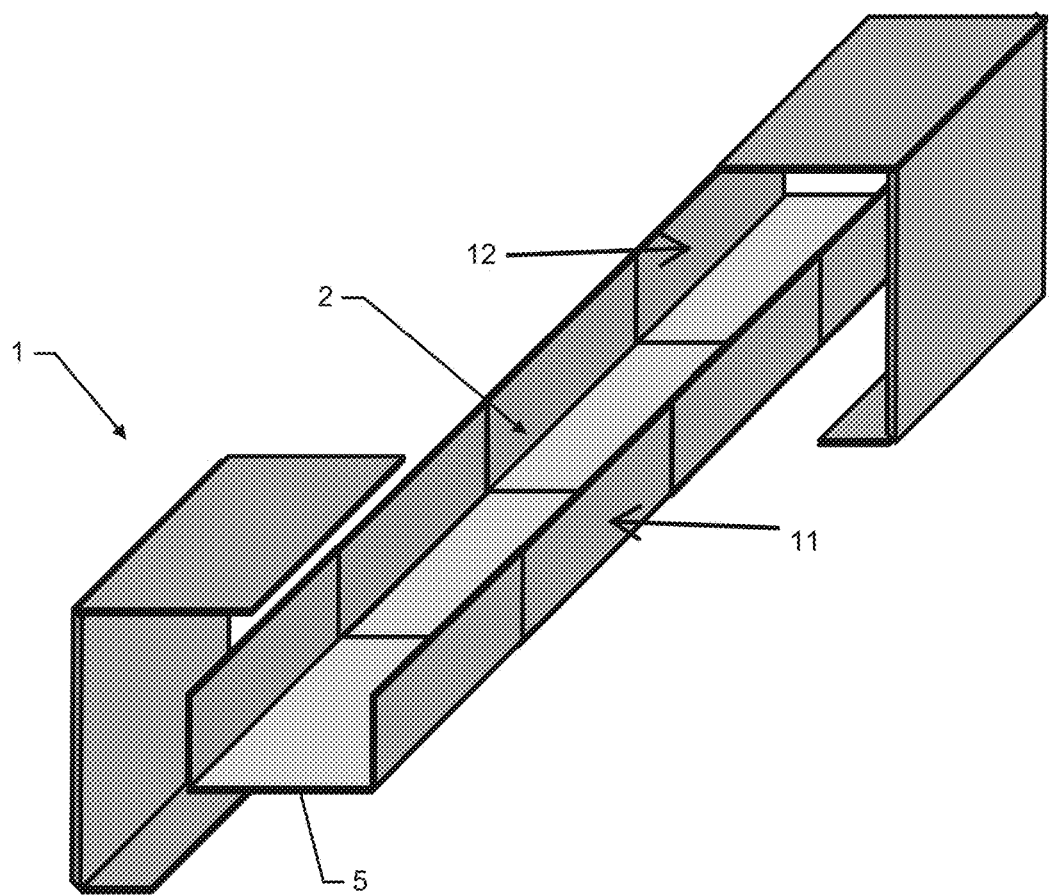
FIG. 14 illustrates a perspective view of a food preparation device according to an example embodiment.
Figure 15:
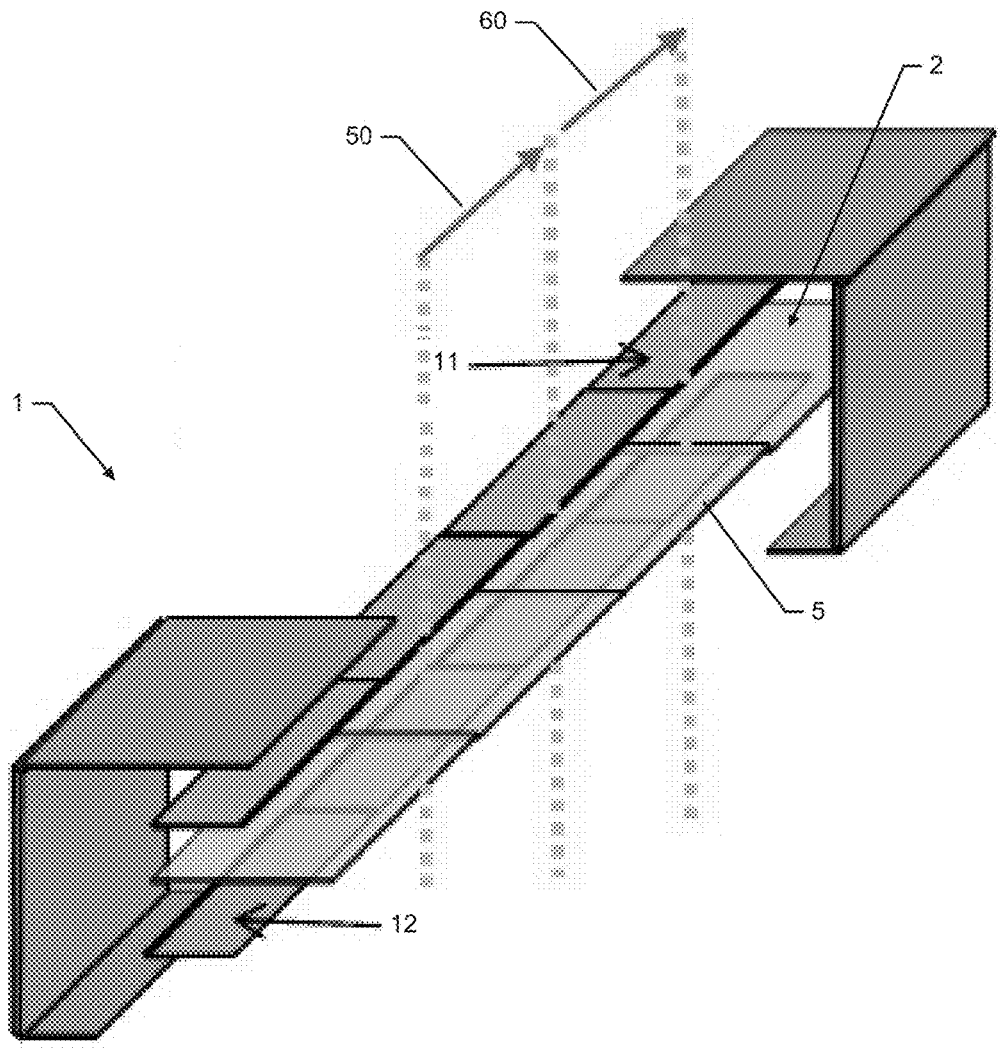
FIG. 15 illustrates a perspective view of a food preparation device according to an example embodiment.

As previously mentioned, the RF capacitive heating source includes an anode plate 11 ((i.e. upper electrode) and a ground plate 12 (i.e. lower electrode, cathode plate). In some embodiments, both the anode plate 11 and the ground plate 12 may be flat, horizontal plates situated substantially parallel to each other. In certain embodiments and as shown in FIG. 2, for example, the anode plate 11 may be positioned above the conveyor belt 5, and the ground plate 12 may be positioned below the conveyor belt 5. In other embodiments, however, the anode plate 11 and the ground plate 12 may be positioned on opposing side walls of the tunnel cavity 2 such that they are substantially perpendicular to the plane in which the conveyor belt 5 is positioned. In other example embodiments and as shown in FIG. 14, the anode plate 11 and the ground plate 12 may move through the tunnel cavity 2 in sync and/or attached to the conveyor belt 5. By way of example only, for instance, the conveyor belt 5 may be a three-sided conveyor belt having the anode plate 11 and the ground plate 12 as the side walls of the conveyor belt 5. In further example embodiments and as shown in FIG. 15, the anode plate 11 may be positioned above the conveyor belt 5 and extend through the length of the tunnel cavity 2, and the ground plate 12 may be positioned below the conveyor belt 5 and extend through the length of the tunnel cavity 2. In this regard, the food preparation device 1 may be configured for one cooking and/or baking function or, alternatively, may be divided into stages (i.e. prep portion 50 and cooking portion 60) lengthwise along the tunnel cavity. The prep portion 50 may include, for example, thawing and proofing operations, and the cooking portion 60 may include baking and/or cooking operations. In example embodiments in which the tunnel cavity is divided into stages, for instance, the anode plate 11 and the ground plate 12 may be divided into a series of separate panels such that each panel may be controlled separately. In this regard, for example, certain portions may be designated for a particular function (e.g., thawing) while other portions may be designated to perform other functions (e.g., proofing, cooking and/or the like).

In some embodiments, the RF capacitive heating source transmits RF energy from about 10 MHz to about 50 MHz. For example, RF energy at the 13 MHz, 27 MHz, or 41 MHz frequency may be transmitted from the anode plate 11 to the ground plate 12, although other frequencies in the RF and microwave spectrum are also possible. A food product of any size, shape, mass, or composition may be placed on the conveyor belt 5 such that the food product will be conveyed through the tunnel cavity 2 between the anode plate 11 and the ground plate 12. After the food product is situated between the anode plate 11 and the ground plate 12 in the tunnel cavity 2, a power source (not shown) may be activated that generates an oscillating electromagnetic field at either 13 MHz or 27 MHz or 41 MHz (frequency is based upon the system's particular design). The electrical signal may be provided through an impedance matching device (not shown) to generate the oscillating electromagnetic field between the anode plate 11 and the ground plate 12, through the food product. The oscillating electromagnetic field between the two plates 11, 12 is very uniform as a direct consequence of the food preparation device 1 design and thereby offers much utility to food processing applications where the control of food products' volumetric thermal conditions is of the utmost importance (e.g. thawing and cooking applications).

When energy is transmitted from the anode plate 11 through the food product to the ground plate 12, some energy may be absorbed by the food product, some energy may be reflected away from the food product, and some energy may be received by the ground plate 12. As a mass of food product (e.g., frozen food product) absorbs energy, its thermal conditions and physical properties change (e.g., energy absorption causes frozen the food product to thaw, transforming ice crystals into water). As the food product thaws, for example, the impedance properties of the food product within the oscillating electromagnetic field between the anode plate 11 and the ground plate 12 changes and therefore so does the relationship between the power which is absorbed by the food product, reflected, or received into the ground plate 12. This changing relationship may be an ongoing occurrence which transpires continuously during the operation of the food preparation device 1. As the most desirable thawing results are those which are achieved through careful management of the power running through the food preparation device 1, for instance, the impedance matching device (not shown) and its respective electronic control may allow the food preparation device 1 to automatically adjust in real-time to the changing electrical impedance of the food product as it transitions, for example, from frozen to thawed. By including both the cold air source and the RF capacitive heating source, for example, supercooled airflow circulated inside the tunnel cavity 2 may control and/or slow the rate of thawing at the exterior surface of the food product in order to mitigate thermal runaway at the exterior surface while the food product interior core is being thawed via the RF capacitive heating source. In this regard, for instance, the food product may be evenly thawed from the exterior surface to the interior core.

In an example embodiment, the first energy source 10 may be an RF capacitive heating source having the anode plate 11 and the ground plate 12 as discussed herein. Both the anode plate 11 and the ground plate 12 may be flat, horizontal plates situated substantially parallel to each other and at least one of the plates may be mobile along an axis (e.g., vertical axis). To take advantage of the fact that the anode plate 11 and the ground plate 12 are mobile, the food preparation device 1 may optionally include a proximity sensor 15. In example embodiments employing the optional proximity sensor 15 may be configured to sense the precise physical location of a food product within the tunnel cavity 2 and/or a distance between the anode plate 11 and the ground plate 12. By having knowledge of the distance between the anode plate 11 and the ground plate 12 via the proximity sensor 15, it may be possible to automatically mechanically position at least one of the plates via a cooking controller 40 according to settings pre-programmed into the cooking controller 40 without reliance on the operator. The proximity sensor 15 may be configured to detect objects in an electric field using an integrated circuit that generates a low-frequency sine wave. The low-frequency sine wave may be adjustable by using an external resistor, optimized for 120 kHz, and may have very low harmonic content to reduce harmonic interference. The proximity sensor 15 may also include support circuits for a microcontroller unit to allow the construction of a two-chip E-field system. In this regard, the proximity sensor 15 (and its associated software functionality) may eliminate the need for an operator to engage in the accurate or precise positioning of the anode plate 11 and/or the ground plate 12 relative to the shape, size, and/or physical location of the food product by automating such functionality.

In some example embodiments, the second energy source 20 may be a cold air source. Thus, for example, the second energy source 20 may include an airflow generator 21 and a chilling element 22. In examples where the second energy source 20 includes the airflow generator 21, the airflow generator 21 may include a fan or other device capable of driving airflow through the tunnel cavity 2 and over a surface of the food product (e.g., via the airflow slots). The chilling element 22 may be a chilling element that employs a refrigerant or other type of chiller that cools air to be driven over the surface of the food product by the airflow generator 21. Both the temperature of the air and the speed of airflow will impact chilling times that are achieved using the second energy source 20.

In an example embodiment, the third energy source 30 may include an airflow generator 31 and a heating element 32. In examples where the third energy source 30 includes the airflow generator 31, the airflow generator 31 may include a fan or other device capable of driving airflow through the tunnel cavity 2 and over a surface of the food product (e.g., via the airflow slots). The heating element 32 may be an electrical heating element or other type of heater that heats air to be driven over the surface of the food product by the airflow generator 31. In example embodiments, the heat source may include magnetic induction, infrared light, hot convection air, steam, or any combination thereof. Both the temperature of the air and the speed of airflow will impact heating times that are achieved using the third energy source 30.

Figure 3:
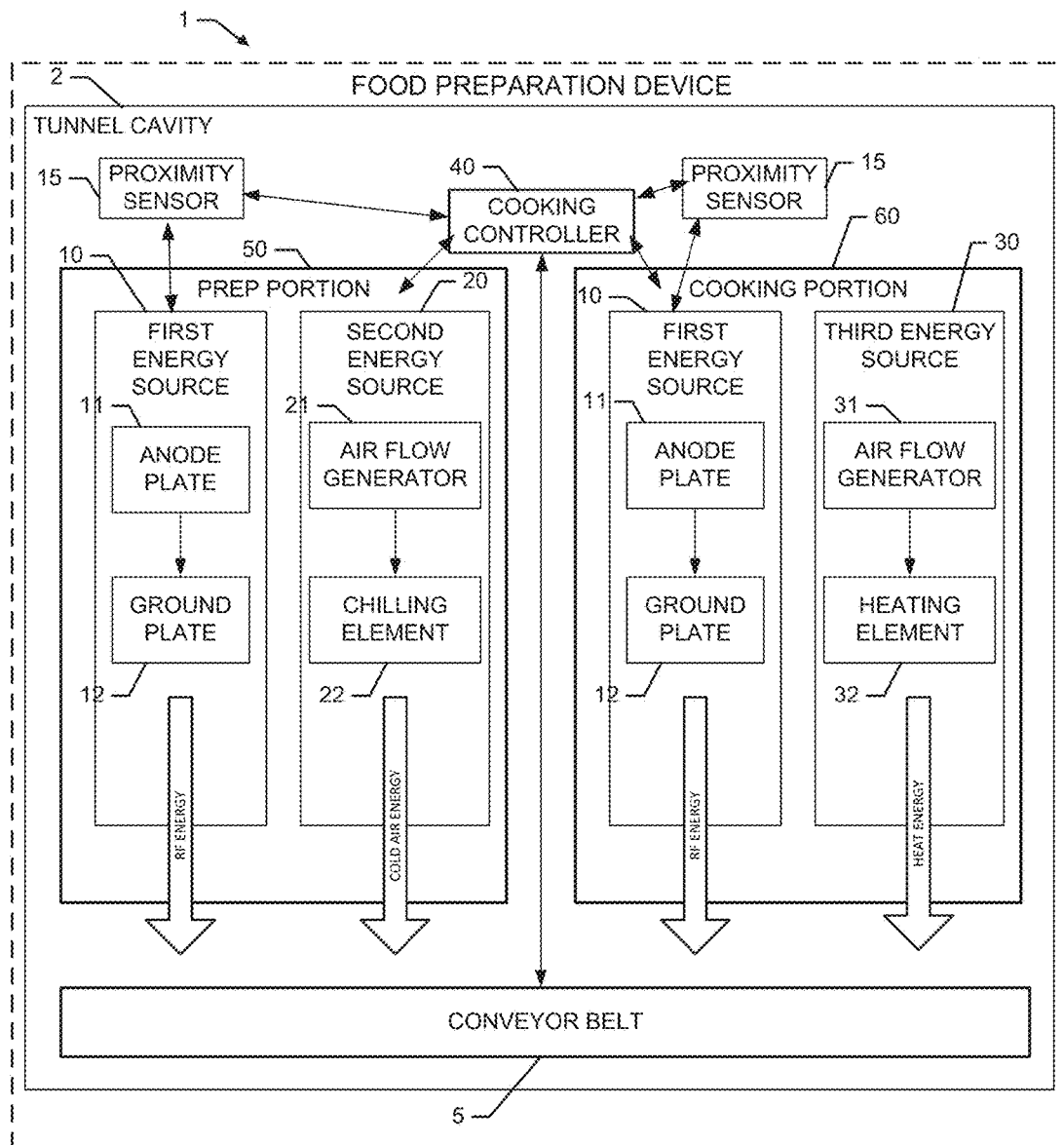
FIG. 3 illustrates a functional block diagram of a food preparation device employing at least an RF capacitive heating source, a cold air source, and a heat source in accordance with an example embodiment.

As previously mentioned, the first energy source 10, second energy source 20, and third energy source 30 may be arrayed in a linear series within the tunnel cavity 2. FIG. 3, for example, illustrates a functional block diagram of a food preparation device employing at least an RF capacitive heating source, a cold air source, and a heat source in accordance with an example embodiment. As shown in FIG. 3, the food preparation device 1 may include at least a first energy source 10, a second energy source 20, and a third energy source 30. The first, second, and third energy sources 10, 20, and 30 may each correspond to respective different cooking methods or may be combined in one of several different cooking methods. However, it should be appreciated that additional energy sources may also be provided in some embodiments and, as stated above, some embodiments may only employ a single energy source. As shown in FIG. 3, the prep portion 50 may include the first energy source 10 and the second energy source 20. In this regard, the prep portion 50 of the tunnel cavity 2 may provide RF capacitive heat energy to a food product positioned on the conveyor belt 5 to thaw the interior core while simultaneously applying cold air to the exterior surface of the food product in order to uniformly thaw the food product. The conveyor belt 5 may then convey the thawed food product to the cooking portion 60 of the tunnel cavity 2. The cooking portion 60 may include another RF capacitive heat source (i.e. first energy source 10) and the third energy source 30 (i.e. heat source). In this regard, the cooking portion 60 of the tunnel cavity 2 may provide additional RF capacitive heat energy to the thawed food product in order to cook the interior core. Either simultaneously with the application of RF capacitive heat energy, before the application of RF capacitive heat energy, or after the application of RF capacitive heat energy, the heat source may apply heat to the exterior surface of the food product in order to cook the exterior surface by, for example, baking, browning, broiling, crisping and/or the like.

In an example embodiment, the first, second, and third energy sources 10, 20, and 30 may be controlled, either directly or indirectly, by the cooking controller 40. Moreover, it should be appreciated that any or all of the first, second, and third energy sources 10, 20, and 30 may be operated responsive to settings or control inputs that may be provided at the beginning, during or at the end of a program cooking cycle. Furthermore, energy delivered via either or both of the first, second, and third energy sources 10, 20, and 30 may be displayable via operation of the cooking controller 40. The cooking controller 40 may be configured to receive inputs descriptive of the food product and/or cooking conditions in order to provide instructions or controls to the first, second, and third energy sources 10, 20, and 30 to control the cooking process. The first energy source 10 may be said to provide heating of the food product interior core, while the second energy source 20 provides cooling of the food product exterior surface to prevent thermal runaway that might otherwise occur at the exterior surface due to the operation of the first energy source 10 in the prep portion 50 of the tunnel cavity 2.

Figure 4:
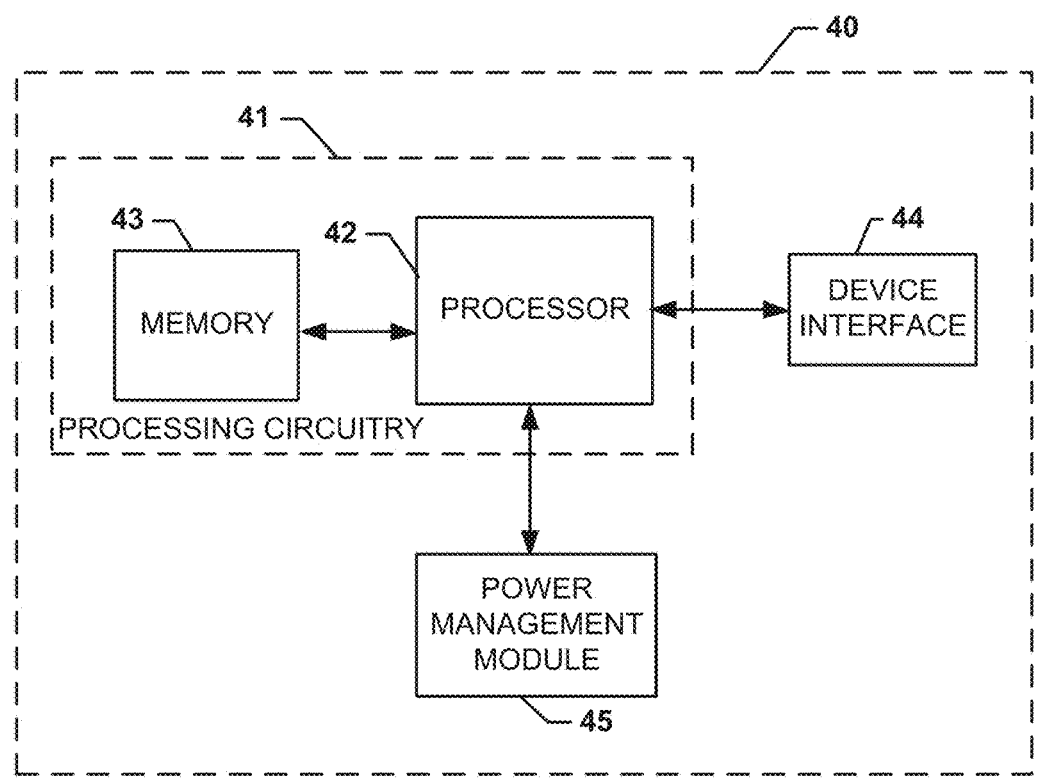
FIG. 4 illustrates a block diagram of a cooking controller according to an example embodiment.

In an example embodiment, the cooking controller 40 may be any means such as a device or circuitry embodied in either hardware, or a combination of hardware and software that is configured to execute (or provide instructions for execution of) a strategic control over power distribution to the at least two energy sources. In this regard, the cooking controller 40 is configured to control volumetric thermal conditions of a food product having an interior core and an exterior surface. In some embodiments, the cooking controller 40 may monitor at least one of humidity, temperature, time, or any combination thereof. FIG. 4 illustrates a block diagram of the cooking controller 40 in accordance with an example embodiment. In this regard, as shown in FIG. 4, the cooking controller 40 may include processing circuitry 41 that may be configured to interface with, control or otherwise coordinate the operations of various components or modules described herein in connection with controlling power distribution to the at least two energy sources as described herein. The cooking controller 40 may utilize the processing circuitry 41 to provide electronic control inputs to one or more functional units of the cooking controller 40 to receive, transmit and/or process data associated with the one or more functional units and perform communications necessary to enable performance of an operator-selected food preparation program as described herein.

In some embodiments, the processing circuitry 41 may be embodied as a chip or chip set. In other words, the processing circuitry 41 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 41 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 41 may include one or more instances of a processor 42 and memory 43 that may be in communication with or otherwise control a device interface 44. As such, the processing circuitry 41 may be embodied as a circuit chip (e.g., an integrated circuit chip) configured (e.g., with hardware, software or a combination of hardware and software) to perform operations described herein.

The device interface 44 may include one or more interface mechanisms for enabling communication with other components or devices (e.g., the interface panel 6). In some cases, the device interface 44 may be any means such as a device or circuitry embodied in either hardware, or a combination of hardware and software that is configured to receive and/or transmit data from/to devices or components in communication with the processing circuitry 41 via internal and/or external communication mechanisms. Accordingly, for example, the device interface 44 may further include wired and/or wireless communication equipment for at least communicating with the at least two energy sources, and/or other components or modules described herein.

The processor 42 may be embodied in a number of different ways. For example, the processor 42 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 42 may be configured to execute instructions stored in the memory 43 or otherwise accessible to the processor 42. As such, whether configured by hardware or by a combination of hardware and software, the processor 42 may represent an entity (e.g., physically embodied in circuitry—in the form of processing circuitry 41) capable of performing operations according to embodiments of the present invention while configured accordingly. Thus, for example, when the processor 42 is embodied as an ASIC, FPGA or the like, the processor 42 may be specifically configured hardware for conducting the operations described herein. Alternatively, as another example, when the processor 42 is embodied as an executor of software instructions, the instructions may specifically configure the processor 42 to perform the operations described herein in reference to execution of an example embodiment.

In an exemplary embodiment, the memory 43 may include one or more non-transitory memory devices such as, for example, volatile and/or non-volatile memory that may be either fixed or removable. The memory 43 may be configured to store information, data, applications, instructions or the like for enabling the processing circuitry 41 to carry out various functions in accordance with exemplary embodiments of the present invention. For example, the memory 43 may be configured to buffer input data for processing by the processor 42. Additionally or alternatively, the memory 43 may be configured to store instructions for execution by the processor 42. As yet another alternative or additional capability, the memory 43 may include one or more databases that may store a variety of data sets or tables useful for operation of the modules described below and/or the processing circuitry 41. Among the contents of the memory 43, applications or instruction sets may be stored for execution by the processor 42 in order to carry out the functionality associated with each respective application or instruction set. In some cases, the applications/instruction sets may include instructions for carrying out some or all of the operations described in reference to algorithms or flow charts for directing control over power distribution and/or various components of the food preparation device 1 as described herein. In particular, the memory 43 may store executable instructions that enable the computational power of the processing circuitry 41 to be employed to improve the functioning of the cooking controller 40 relative to the control over the at least two energy sources as described herein. As such, the improved operation of the computational components of the cooking controller 40 transforms the cooking controller 40 into a more capable power distribution control device relative to the at least two energy sources and/or food preparation device 1 associated with executing example embodiments.

As shown in FIG. 4, the cooking controller 40 may further include (or otherwise be operably coupled to) a power management module 45. In some examples, the processor 42 (or the processing circuitry 41) may be embodied as, include or otherwise control various modules (e.g., the power management module 45) that are configured to perform respective different tasks associated with the cooking controller 40. As such, in some embodiments, the processor 42 (or the processing circuitry 41) may be said to cause each of the operations described in connection with the power management module 45 as described herein.

The power management module 45 may be any means such as a device or circuitry embodied in either hardware, or a combination of hardware and software that is configured to execute control over the distribution of power to the at least two energy sources. In this regard, the power management module 45 may be configured to receive cooking information (e.g., from a user via the interface panel 6) regarding the food product or a cooking mode or program to be executed. Based on the cooking information provided, the power management module 45 may select a power distribution algorithm from among a plurality of stored power distribution algorithms. The selected power distribution algorithm may then be executed to provide power to the desired energy sources at desirable times, power levels, sequences and/or the like.

In an example embodiment, the power management module 45 may include a plurality of stored algorithms, each of which defines a corresponding pattern (e.g., predetermined or random) for power distribution to the at least two energy sources. In some cases, the stored algorithms may be associated with corresponding different cooking programs, cooking modes, or such algorithms may be named and selectable by the user from a menu. Regardless of how selected, once the power management module 45 selects an algorithm, the selected power distribution algorithm may be executed by the processing circuitry 41, which ultimately provides for control inputs to be provided to the at least two energy sources.

In some embodiments, the cooking controller 40 (and/or the power management module 45) may be configured to receive static and/or dynamic inputs regarding the food product and/or cooking conditions. Dynamic inputs may include feedback data regarding absorption of RF spectrum, as described above. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), and/or the like.

Figure 5:
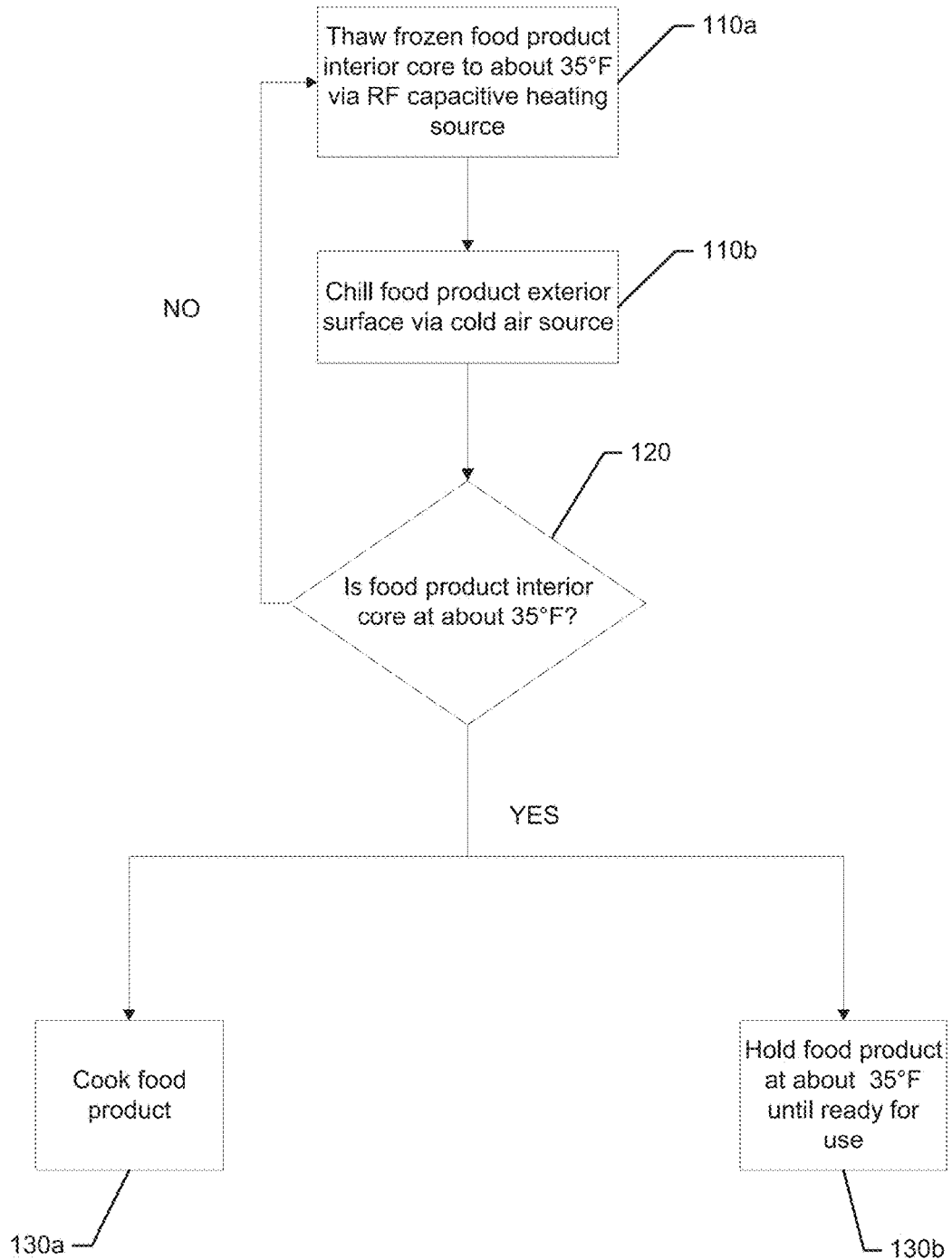
FIG. 5 illustrates a control flow diagram of one example of how the cooking controller thaws a food product in accordance with an example embodiment.

FIGS. 5-12 illustrate examples of how the cooking controller 40 controls volumetric thermal conditions of a food product according to example embodiments. It should be understood that the cooking controller 40 operates to interact with and control other functional units of the food preparation device 1. As such, when various functions or activities are attributed to the cooking controller 40 herein, it should be further appreciated that such functions or activities may be performed via the exercising of control over other components. FIG. 5, for example, illustrates a control flow diagram of one example of how the cooking controller 40 thaws a food product in accordance with an example embodiment. As shown in FIG. 5, the cooking controller 40 thaws a frozen food product interior core to about 35° F. via the RF capacitive heating source at operation 110a and chills the food product exterior surface via the cold air source at operation 110b. While operations 110a and 110b appear in series in FIG. 5, it may be understood that operations 110a and 110b may occur sequentially, in reverse, or simultaneously. In this regard, the food product may be rapidly and uniformly thawed in the prep portion 50 of the tunnel cavity 2 without partial cooking in order to maintain natural moisture and inherent food product quality. The cooking controller 40 then determines whether the food product interior core has reached about 35° F. at operation 120. If the food product interior core has reached about 35° F., then the cooking controller 40 may control the conveyor belt 5 to convey the food product to the cooking portion 60 to cook the food product at operation 130*a* or hold the food product at about 35° F. until ready for use at operation 130*b*. Moreover, the food product may be immediate consumed. However, if the food product interior core has not reached about 35° F., then the cooking controller 40 may continue to thaw the food product interior core to about 35° F. via the RF capacitive heating source while chilling the food product exterior surface via the cold air source at operations 110*a* and 110*b* respectively in the prep portion 50 of the tunnel cavity 2.

According to certain embodiments, for example, the cooking controller may thaw the food product interior core to a temperature from about 32° F. to about 40° F. In other embodiments, for instance, the cooking controller 40 may thaw the food product interior core to a temperature from about 33° F. to about 37° F. In further embodiments, for example, the cooking controller 40 may thaw the food product interior core to a temperature to about 35° F. As such, in certain embodiments, the cooking controller 40 may thaw the food product interior core to a temperature from at least about any of the following: 32, 33, 34, and 35° F. and/or at most about 40, 39, 38, 37, 36, and 35° F. (e.g., about 34-38° F., about 35-40° F., etc.).

Figure 6:
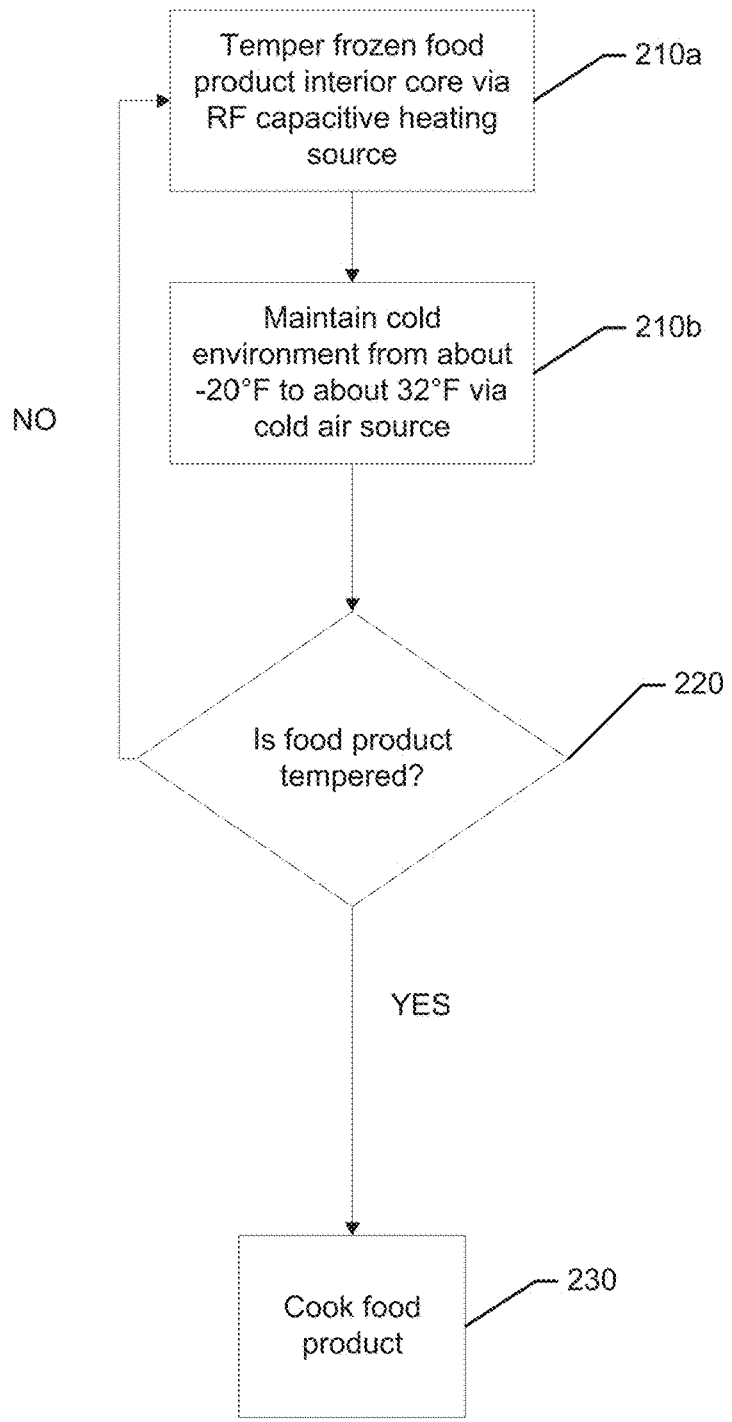
FIG. 6 illustrates a control flow diagram of one example of how the cooking controller tempers a food product in accordance with an example embodiment.

FIG. 6, for example, illustrates a control flow diagram of one example of how the cooking controller 40 tempers a food product in accordance with an example embodiment. In this regard, the frozen food product may be pre-staged and/or pre-thawed for immediate cooking by exposing the food product to a limited amount of heat prior to cooking. For example, the cooking controller 40 may employ high powered thawing of frozen portion-sized food products (e.g., chicken wings) for immediate transfer to hot oil (or any other direct or indirect heat source) for cooking. As shown in FIG. 6, the cooking controller 40 tempers a frozen food product interior core via the RF capacitive heating source at operation 210*a* and maintains a cold environment from about −20° F. to about 32° F. within the prep portion 50 of the tunnel cavity 2 via the cold air source at operation 210*b*. While operations 210*a* and 210*b* appear in series in FIG. 5, it may be understood that operations 210*a* and 210*b* may occur sequentially, in reverse, or simultaneously. The cooking controller 40 then determines whether the food product is adequately tempered at operation 220. If the food product has been adequately tempered, then the cooking controller 40 may control the conveyor belt 5 to convey the food product to the cooking portion 60 for cooking at operation 230. If the food product has not been adequately tempered, then the cooking controller 40 may continue to temper the food product interior core via the RF capacitive heating source while maintaining the cold environment from about −20° F. to about 32° F. within the tunnel cavity 2 via the cold air source at operations 210*a* and 210*b* respectively in the prep portion 50 of the tunnel cavity 2.

Figure 7:
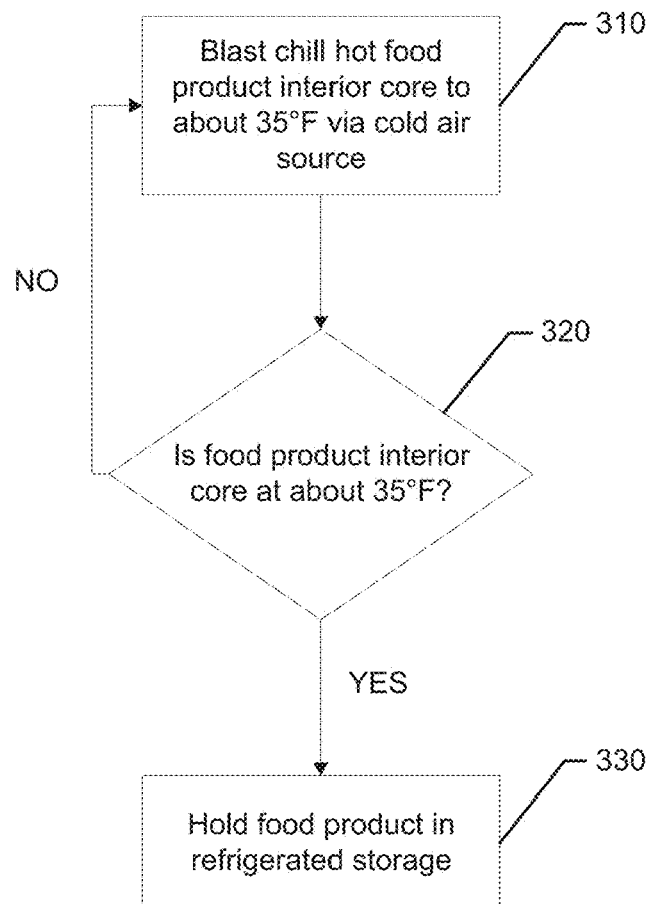
FIG. 7 illustrates a control flow diagram of one example of how the cooking controller blast chills a food product according to an example embodiment.

FIG. 7, for example, illustrates a control flow diagram of one example of how the cooking controller 40 blast chills a food product according to an example embodiment. In this regard, the cooking controller may chill hot food rapidly in order to stop bacterial proliferation and ensure freshness. As shown in FIG. 7, the cooking controller 40 blast chills a hot food product interior core to about 35° F. via the cold air source at operation 310 in the prep portion 50 of the tunnel cavity 2. The cooking controller 40 then determines whether the food product interior core has reached about 35° F. at operation 320. If the food product interior core has reached about 35° F., then the cooking controller 40 will hold the food product in refrigerated storage at operation 330. However, if the food product interior core has not reached about 35° F., then the cooking controller 40 will continue to blast chill the food product interior core to about 35° F. via the cold air source at operation 310 in the prep portion 50 of the tunnel cavity 2.

According to certain embodiments, for example, the cooking controller 40 may blast chill the hot food product interior core to a temperature from about 32° F. to about 40° F. In other embodiments, for instance, the cooking controller 40 may blast chill the hot food product interior core to a temperature from about 33° F. to about 37° F. In further embodiments, for example, the cooking controller 40 may blast chill the hot food product interior core to a temperature to about 35° F. As such, in certain embodiments, the cooking controller 40 may blast chill the hot food product interior core to a temperature from at least about any of the following: 32, 33, 34, and 35° F. and/or at most about 40, 39, 38, 37, 36, and 35° F. (e.g., about 34-38° F., about 35-40° F., etc.).

Figure 8:
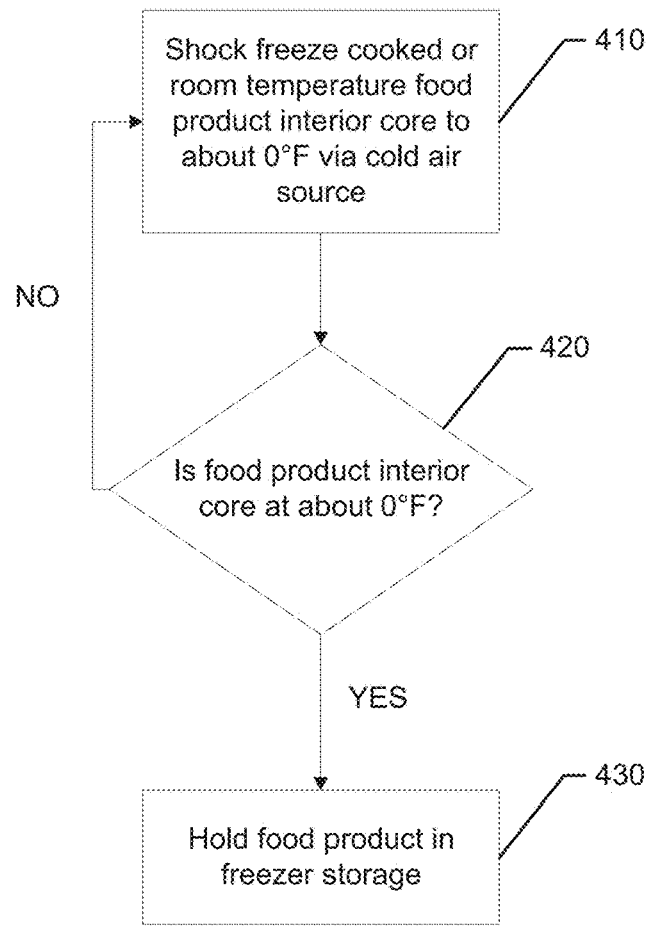
FIG. 8 illustrates a control flow diagram of one example of how the cooking controller shock freezes a food product in accordance with an example embodiment.

FIG. 8, for example, illustrates a control flow diagram one example of how the cooking controller 40 shock freezes a food product in accordance with an example embodiment. In this regard, the faster freezing takes place, the better food quality is preserved. As such, when "shock frozen" food is thawed, it will retain its freshness and quality as if it had never been in the freezer. As shown in FIG. 8, the cooking controller 40 shock freezes a cooked or room temperature food product interior core to about 0° F. via the cold air source at operation 410 in the prep portion 50 of the tunnel cavity 2. The cooking controller 40 then determines whether the food product interior core has reached about 0° F. at operation 420. If the food product interior core has reached about 0° F., then the cooking controller 40 will hold the food product in freezer storage at operation 430. If the food product interior core has not reached about 0° F., then the cooking controller 40 may continue to shock freeze the food product interior core to about 0° F. via the cold air source at operation 410 in the prep portion 50 of the tunnel cavity 2.

According to certain embodiments, for example, the cooking controller 40 may shock freeze the food product interior core to a temperature from about −50° F. to about 20° F. In other embodiments, for instance, the cooking controller 40 may shock freeze the food product interior core to a temperature from about −40° F. to about 10° F. In further embodiments, for example, the cooking controller 40 may shock freeze the food product interior core to a temperature to about 0° F. As such, in certain embodiments, the cooking controller 40 may thaw the food product interior core to a temperature from at least about any of the following: −50, −40, −30, −20, −10, and 0° F. and/or at most about 20, 15, 10, 5, and 0° F. (e.g., about −40-0° F., about −10-10° F., etc.).

Figure 9:
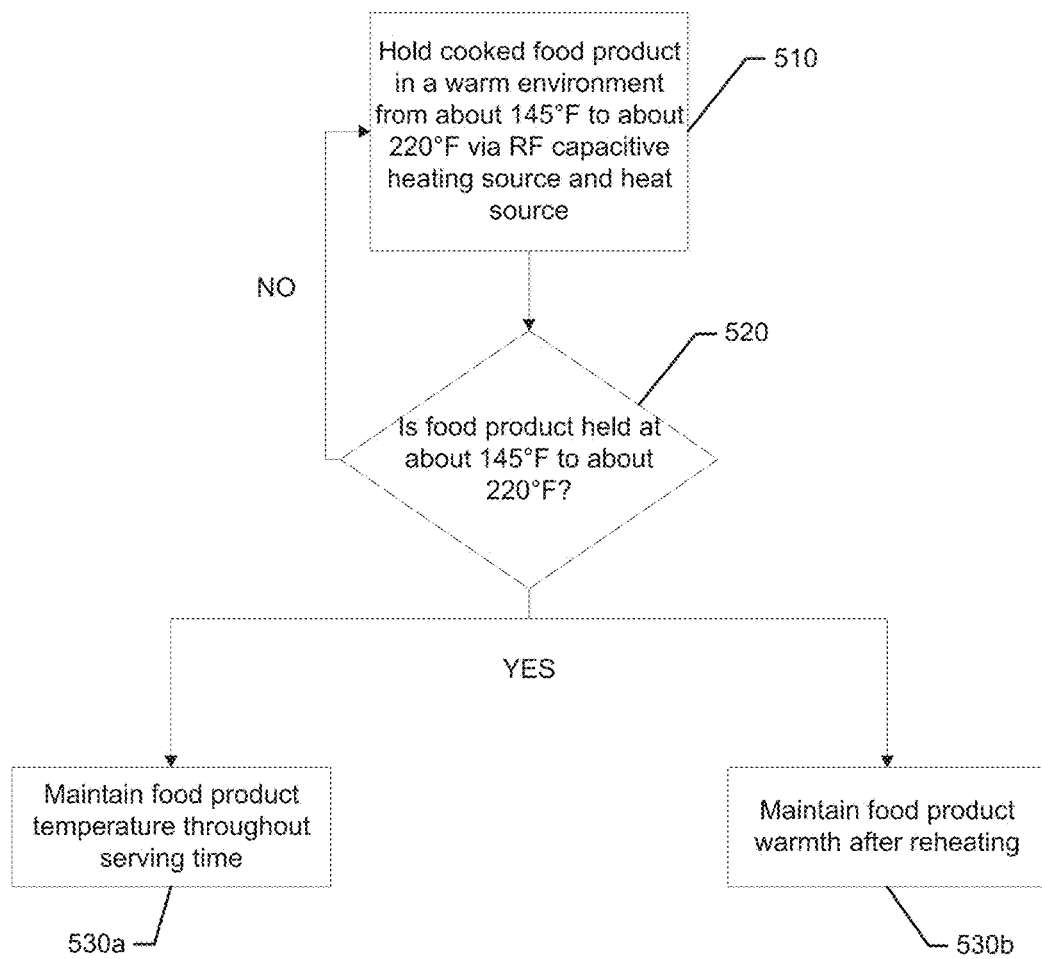
FIG. 9 illustrates a control flow diagram of one example of how the cooking controller holds a food product at a temperature according to an example embodiment.

FIG. 9, for example, illustrates a control flow diagram of one example of how the cooking controller 40 holds a food product at a temperature according to an example embodiment. As shown in FIG. 9, the cooking controller 40 holds a cooked food product in a warm environment from about 145° F. to about 220° F. via the RF capacitive heating source and the heat source at operation 510 in the cooking portion 60 of the tunnel cavity 2. The cooking controller 40 then determines whether the food product is adequately held at about 145° F. to about 220° F. at operation 520. If the food product is adequately held at about 145° F. to about 220° F., then the cooking controller 40 either will maintain the food product temperature throughout serving time or maintain the food product warmth after reheating at operations 530*a* and 530*b* respectively in the cooking portion 60 of the tunnel cavity 2 depending on the food product preparation program selected by an operator. However, if the food product is not adequately held at about 145° F. to about 220° F., then the cooking controller 40 may continue to hold the food product in a warm environment from about 145° F. to about 220° F. via the RF capacitive heating source and the heat source at operation 510 in the cooking portion 60 of the tunnel cavity 2. In some example embodiments, the cooking controller 40 may thaw the food product in the prep portion 50 of the tunnel cavity 2 before holding the food product at a selected temperature. In further embodiments, the cooking controller 40 may automatically reheat food products to a serving temperature of about 165° F. after holding the food product at a selected temperature in the cooking portion 60 of the tunnel cavity 2.

Figure 10:
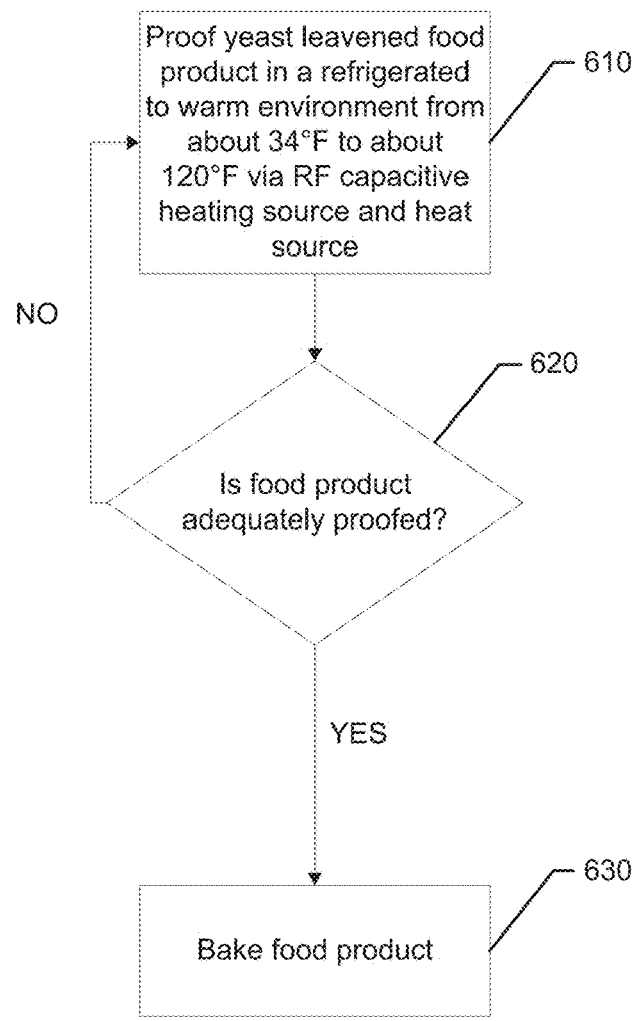
FIG. 10 illustrates a control flow diagram of one example of how the cooking controller proofs a food product according to an example embodiment.

FIG. 10, for example, illustrates a control flow diagram of one example of how the cooking controller 40 proofs a food product according to an example embodiment. As shown in FIG. 10, the cooking controller 40 proofs a yeast leavened food product (e.g., yeast leavened dough for bread or pizza) in a refrigerated to warm environment from about 34° F. to about 120° F. via the RF capacitive heating source and the heat source at operation 610 in the cooking portion 60 of the tunnel cavity 2. The cooking controller 40 then determines whether the food product is adequately proofed at operation 620. If the food product is adequately proofed, then the cooking controller 40 may bake the food product at operation 630 in the cooking portion 60 of the tunnel cavity 2. If the food product is not adequately proofed, then the cooking controller 40 may continue proofing the food product in a refrigerated to warm environment from about 34° F. to about 120° F. via the RF capacitive heating source and the heat source at operation 610 in the cooking portion 60 of the tunnel cavity 2. In this regard, the cooking controller 40 maintains an ideal proofing temperature so that the yeast fermentation cycle is completed in ideal conditions. Moreover, the food preparation device may be used to program thawing for frozen yeast dough products (e.g., croissants). In such embodiments, the frozen yeast dough products may be thawed in the prep portion 50 of the tunnel cavity 2 and then proofed at a controlled temperature and humidity for later baking in the cooking portion 60 of the tunnel cavity 2.

Figure 11:
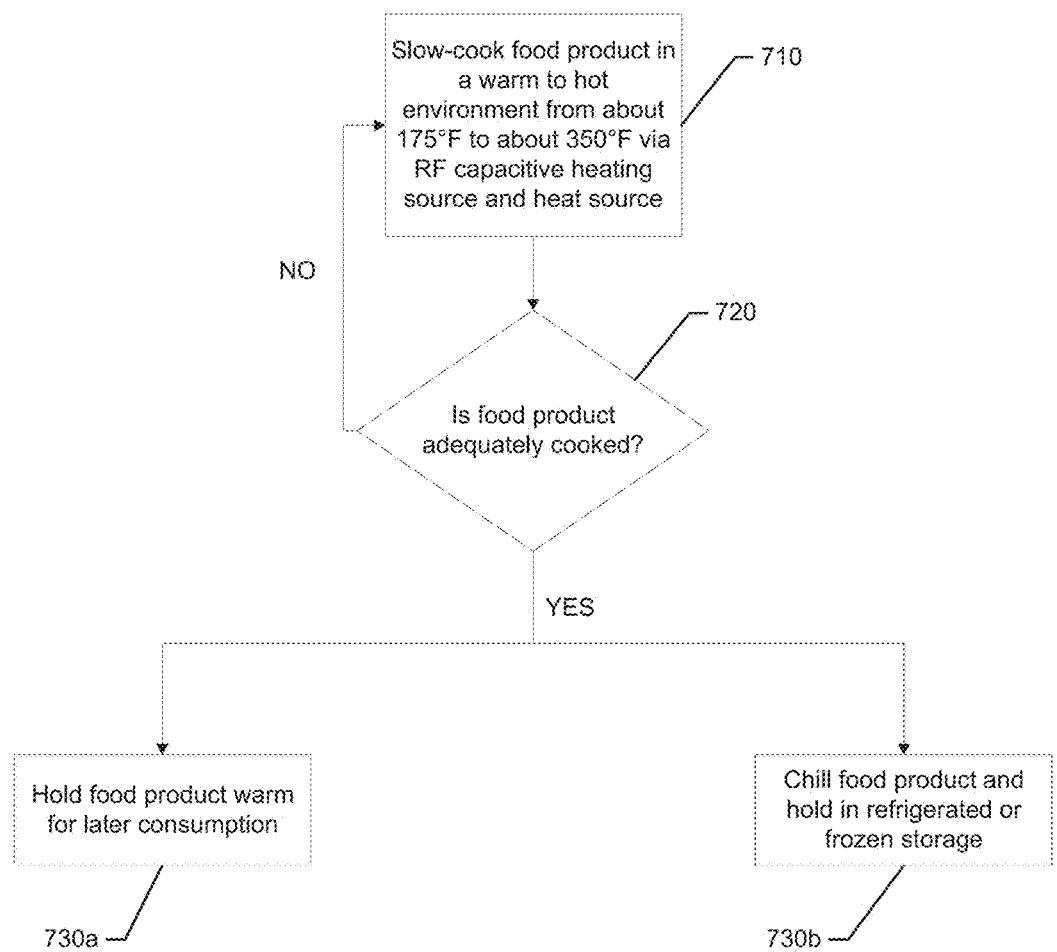
FIG. 11 illustrates a control flow diagram of one example of how the cooking controller slow-cooks a food product according to an example embodiment.

FIG. 11, for example, illustrates a control flow diagram of one example of how the cooking controller slow-cooks a food product according to an example embodiment. In this regard, food products may be cooked slowly and at low temperatures to, for example, effectively tenderize tough muscle cuts and achieve sufficient flavor and quality characteristics. As shown in FIG. 11, the cooking controller slow-cooks a food product in a warm to hot environment from about 175° F. to about 350° F. via the RF capacitive heating source and the heat source at operation 710 in the cooking portion 60 of the tunnel cavity 2. The cooking controller then determines whether the food product is adequately cooked at operation 720. If the food product is adequately cooked, then the cooking controller can either hold the food product warm for later consumption at operation 730*a* in the cooking portion 60 of the tunnel cavity 2 or chill the food product and hold the chilled food product in refrigerated or frozen storage at operation 730*b* in the prep portion 50 of the tunnel cavity 2. Moreover, the food product may be immediately consumed. However, if the food product is not adequately cooked, then the cooking controller will continue to slow-cook the food product in a warm to hot environment from about 175° F. to about 350° F. via the RF capacitive heating source and the heat source at operation 710 in the cooking portion 60 of the tunnel cavity 2. According to certain embodiments, slow-cooking may be preceded by thawing or holding at about 35° F. in the prep portion 50 of the tunnel cavity 2.

Figure 12:
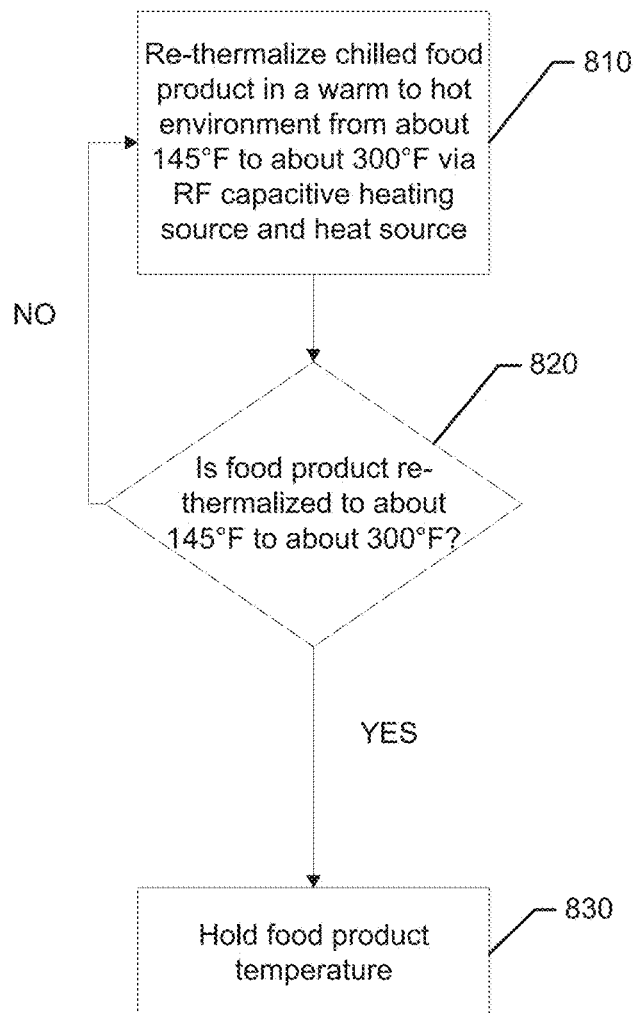
FIG. 12 illustrates a control flow diagram of one example of how the cooking controller re-thermalizes a food product according to an example embodiment.

FIG. 12, for example, illustrates a control flow diagram of one example of how the cooking controller re-thermalizes a food product according to an example embodiment. As shown in FIG. 12, the cooking controller re-thermalizes a chilled food product in a warm to hot environment from about 142° F. to about 300° F. via the RF capacitive heating source and the heat source at operation 810 in the cooking portion 60 of the tunnel cavity 2. The cooking controller then determines whether the food product has been adequately re-thermalized to about 145° F. to about 300° F. at operation 820. If the food product has been adequately re-thermalized to about 145° F. to about 300° F., then the cooking controller may hold the food product temperature at operation 830 in the cooking portion 60 of the tunnel cavity 2. However, if the food product has not been adequately re-thermalized to about 145° F. to about 300° F., then the cooking controller will continue to re-thermalize the food product in a warm to hot environment from about 145° F. to about 300° F. at operation 810 in the cooking portion 60 of the tunnel cavity 2. In some example embodiments, the cooking controller may hold food products at about 35° F. in the prep portion 50 of the tunnel cavity 2 before automatically reheating the food product to a serving temperature of about 165° F. in the cooking portion 60 of the tunnel cavity 2. In further embodiments, the cooking controller may thaw the food product in the prep portion 50 of the tunnel cavity 2 prior to holding the food product at a selected temperature in either the prep portion 50 or the cooking portion 60 of the tunnel cavity 2 depending on the selected temperature.

In this regard, the food preparation device may include a prep portion and a cooking portion within the tunnel cavity that allow the food preparation device to transform from a freezer to a cooker as a food product is conveyed through the respective portions of the tunnel cavity via the conveyor belt, effectively transforming a food product initially held frozen in storage to a hot and servable dish for immediate consumption. The entire process may be automated such that the operator must only supply the food item and initiate the correct program. Once the food product is cooked, it may be held warm at a safe and servable temperature or it may be rapidly chilled for safe storage and use later. As such, the food preparation device may provide via the cooking controller a series of different operations (e.g., thawing, tempering, blast chilling, shock freezing, holding, proofing, slow-cooking, re-thermalizing and/or the like), some of which occur simultaneously or at distinct times, via a linear array of energy sources within the tunnel cavity.

Figure 13:
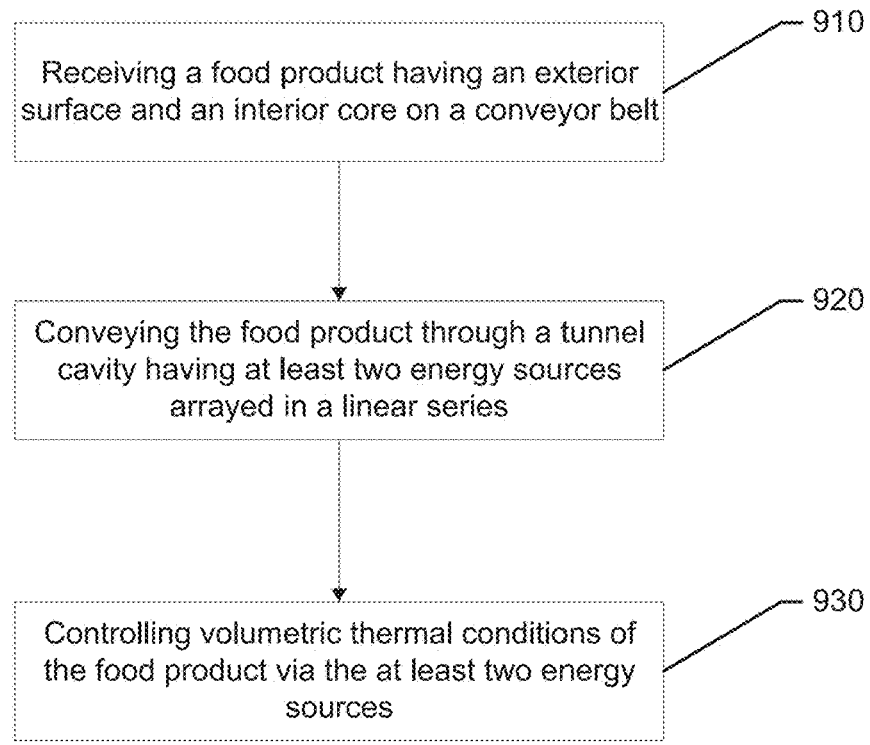
FIG. 13 illustrates a block diagram of a method of preparing food in accordance with an example embodiment.

In another aspect, a method of preparing food is provided. The method may include receiving a food product having an interior core and an exterior surface on a conveyor belt, conveying the food product through a tunnel cavity having at least two energy sources arrayed in a linear series, and controlling volumetric conditions of the food product via the at least two energy sources. According to certain embodiments, for example, conveying the food product through a tunnel cavity having at least two energy sources arrayed in a linear series may comprise conveying the food product to a prep portion of the tunnel cavity and a cooking portion of the tunnel cavity. In this regard, as the food product is conveyed through the tunnel cavity, the at least two energy sources may be used individually or in combination. In certain embodiments, the at least two energy sources may comprise an RF capacitive heating source and at least one air source. The RF capacitive heating source may include a ground plate and an anode plate, and the air source may include at least one of a cold air source or a heat source. Moreover, each of the cold air source and the heat source may include an air flow generator. In addition, the cold air source may also include a chilling element, and the heat source may further include a heating element. According to certain embodiments, for instance, the food product may be rapidly thawed via a first RF capacitive heating source and the cold air source. The food product interior core may then be heated via a second RF capacitive heating source, and the food product exterior surface may then be cooked via the heat source. FIG. 13, for example, illustrates a block diagram of a method of preparing food in accordance with an example embodiment. As shown in FIG. 13, the method includes receiving a food product having an interior core and an exterior surface on a conveyor belt at operation 910, conveying the food product through a tunnel cavity having at least two energy sources arrayed in a linear series at operation 920, and controlling volumetric conditions of the food product via the at least two energy sources at operation 930.

Example embodiments may provide a food preparation device capable of providing even thawing of a food product from the exterior surface to the interior core by thawing the interior core with an RF capacitive heating source while cooling the exterior surface with a cold air source. Moreover, the food preparation device may simplify food preparation by providing various operator-selectable recipes and cycles to further prepare the food product as the food product is conveyed through a tunnel cavity. Thus, for example, a fully frozen food product may be placed on a conveyor belt and a plurality of different operations including at least RF capacitive thawing and cooking may be performed in sequence as the food product is conveyed through the tunnel cavity. A single device can therefore take a food product from frozen to cooked or otherwise prepared by conveying the food product through multiple areas at which different operations are performed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A food preparation device comprising:
   a tunnel cavity having a prep portion configured to thaw a frozen food product to generate a thawed food product and a cooking portion configured to cook the thawed food product;
   a conveyor belt extending through a length of the tunnel cavity;
   a radio frequency (RF) capacitive heating source;
   a cold air source;
   a cooking controller operably coupled to the prep portion and the cooking portion to selectively distribute power to at least the RF capacitive heating source and the cold air source in the prep portion and at least a heat source in the cooking portion; and
   an interface panel,
   wherein the prep portion and the cooking portion are positioned in a linear series in the tunnel cavity,
   wherein the RF capacitive heating source comprises a ground plate and an anode plate,
   wherein the food preparation device further comprises a proximity sensor to sense a distance between the ground plate and the anode plate,
   wherein the cooking controller is configured to automatically mechanically position at least one of the ground plate or the anode plate, and
   wherein the cooking portion is separate from the prep portion and the cooking portion does not include the cold air source.

2. The food preparation device of claim 1, wherein the ground plate is disposed under the conveyor belt, and the anode plate is mobile to change a distance between the anode plate and the ground plate.

3. The food preparation device of claim 1, wherein the ground plate and the anode plate are disposed on opposing sides of the conveyor belt.

4. The food preparation of device of claim 1, wherein the RF capacitive heating source transmits RF energy from about 10 MHz to about 50 MHz.

5. The food preparation device of claim 1, wherein the prep portion is configured to thaw the frozen food product by utilizing the RF capacitive heating source to apply heat to the frozen food product while cold air is applied to an exterior surface of the frozen food product by the cold air source.

6. The food preparation device of claim 1, wherein each of the cold air source and the heat source comprises an air flow generator, the cold air source further comprising a chilling element, and the heat source further comprising a heating element.

7. The food preparation device of claim 6, wherein the heat source comprises at least one of magnetic induction, infrared light, hot convection air, steam, or any combination thereof.

8. The food preparation device of claim 1, wherein the cooking portion comprises the heat source and a second RF capacitive heating source.

9. The food preparation device of claim 8, wherein the cooking portion is configured to heat a food product interior core of the thawed food product and also brown an exterior surface of the thawed food product.

10. The food preparation device of claim 1, wherein the conveyor belt conveys a food product from the prep portion to the cooking portion.

11. The food preparation device of claim 1, wherein the conveyor belt operates continuously or pauses for a predetermined amount of time in each of the prep portion and the cooking portion.

12. The food preparation device of claim 1, wherein the cooking controller monitors at least one of humidity, temperature, time, or any combination thereof.

13. The food preparation device of claim 1, wherein the cooking controller is configured to control volumetric thermal conditions of the thawed food product having an interior core and an exterior surface.

14. The food preparation device of claim 1, wherein the cooking controller is configured to automatically mechanically position at least one of the ground plate or the anode plate based on settings pre-programmed into the cooking controller.

15. The food preparation device of claim 14, wherein the settings pre-programmed into the cooking controller comprise a shape, a size, or a physical location of the frozen food product.

* * * * *

UNITED STATES PATENT AND TRADEMARK OFFICE
CERTIFICATE OF CORRECTION

PATENT NO.        : 10,368,692 B2
APPLICATION NO.   : 14/842219
DATED             : August 6, 2019
INVENTOR(S)       : Giorgio Grimaldi et al.

Page 1 of 1

It is certified that error appears in the above-identified patent and that said Letters Patent is hereby corrected as shown below:

On the Title Page

On (73) Assignee: "HUSQVARNA AB, Huskvarna, (SE)," should be -- ILLINOIS TOOL WORKS INC., Glenview IL (US) --

Signed and Sealed this
Twenty-first Day of July, 2020

Andrei Iancu
*Director of the United States Patent and Trademark Office*